United States Patent Office 3,086,064
Patented Apr. 16, 1963

3,086,064
FLUORINATION PROCESS AND CATALYST
Joseph C. Cohen, Salindres, France, assignor to
Pechiney, Paris, France
No Drawing. Filed May 27, 1960, Ser. No. 32,134
Claims priority, application France May 29, 1959
11 Claims. (Cl. 260—653.7)

This invention is addressed to a new and improved halogenation catalyst and a new and improved halogenation process embodying the use of same and it relates more particularly to a catalyst and process for fluorination of halogenated aliphatic hydrocarbons.

It is an object of this invention to produce a new and improved catalyst and process for halogenation of organic compounds and it is a related object to produce a new and improved catalyst and process for fluorination of halogenated aliphatic hydrocarbons.

It has been found, in accordance with the practice of this invention, that substantially quantitative conversion to substitute fluorine on halogenated aliphatic organic compounds can be achieved when the halogenation reaction is carried out in the presence of a compound of gallium as a catalyst. As the fluorinating agent, hydrofluoric acid or hydrogen fluoride is used. It is preferred to carry out the described fluorination reaction at a temperature within the range of 175–450° C. with and preferably without pressure.

For example, chlorofluorinated derivatives and fluorinated derivatives of methane, ethane, propane and the like aliphatic hydrocarbons are capable of being obtained at high yields.

As the gallium catalyst, use can be made of the inorganic or organic salts of gallium, such as gallium fluoride, gallium chloride, gallium nitrate, gallium acetate, gallium formate, and the like, or gallium oxides or organo-metallic derivatives of gallium. The gallium catalytic agent may be used alone or in combination with a suitable carrier, such as aluminum oxide or activated charcoal.

When the gallium catalyst is used without a carrier, it is generally employed in the form of pellets or other particulate form. In use, a current of the fluorinating agent is brought into contact with the reaction medium containing the pellets or while in the presence of the pellets under temperature conditions controlled to avoid volatilization of the gallium compound or otherwise to maintain such volatilization to a minimum. In general, this can be achieved at a temperature within the range of 80–250° C.

When the catalyst is employed on a suitable adsorbent carrier, the catalyst is introduced onto the carrier by impregnation from a solution or dispersion of the gallium compound in organic solvents or in aqueous medium, use being preferably made of a gallium salt with volatile anions or of an organometallic derivative of gallium. The carrier containing the catalytic agent is then introduced into a reactor wherein a fluorinating agent, such as hydrofluoric acid, is passed through while the entire system is heated to a temperature at which gallium fluoro compounds are formed and retained on the support or carrier. For this purpose, a temperature in the range of 150–250° C. is suitable.

When use is made of a gallium based catalyst fluorinated under the conditions described, transformation rates have been secured, compounded on the basis of hydrofluoric acid, which are as good and more often superior to those obtained with presently known halogenation catalysts, such as aluminum fluoride, chromium fluoride, zirconium fluoride, and the like. For example, in the fluorination of chloroform to difluorochloromethane and trifluoromethane, a distinct advantage is derived from the use of the gallium catalyst. Even at temperatures as low as 175° C., the transformation rate based upon hydrofluoric acid will range from 85–90 percent. This is particularly important because it is desirable to be able to carry out the fluorination reaction at low temperature since the degree of fluorination of chlorofluorinated hydrocarbons is substantially dependent upon temperature, the lower the temperature the lower the fluorination degree.

As a result, by fluorinating chloroform with hydrofluoric acid on a gallium catalyst, it is possible to obtain a ratio of difluorochloromethane to difluorochloromethane plus trifluoromethane of .95 with a transformation rate of 90 percent based upon hydrofluoric acid.

The following examples are given by way of illustration, but not by way of limitation, of the practice of this invention:

*Example 1*

Activated charcoal, 400 parts, in granular form is treated with 6 N hydrocloric acid, and then washed, drained and dried. The dried carbon is placed in a tubular furnace, preferably though not necessarily formed of Monel metal, and treated with a current of hydrofluoric acid at 300° C. This reacts to free the carbon of silica. Thereafter, it is impregnated with gallic chloride dissolved in carbon tetrachloride in amounts corresponding to 75.5 parts by weight of gallic chloride to 750 parts by weight of carbon tetrachloride. Upon impregnation with the solution of gallic chloride, the treated carbon continues to appear dry.

The gallium chloride on the charcoal carrier is introduced into a vertical tubular furnace, preferably formed of Monel metal, and which is provided with a jacket for air cooling and with electrical elements for heating. Anhydrous hydrofluoric acid is introduced into the bottom of the furnace at 100° C. During the course of the reaction, the temperature rises gradually to about 200° C. and thereafter begins to fall off so that use is largely made of the external heating means for purposes of maintaining the temperature in the vicinity of 150° C.

Completion of the fluorination reaction is indicated when the exhaust or effluent gases from the furnace are substantially free of hydrochloric acid and formed mostly if not entirely of hydrofluoric acid. This will usually occur when 56 parts by weight of hydrofluoric acid has been introduced.

In use, 140 parts of hydrofluoric acid (7 mols) and 715 parts by weight of carbon tetrachloride (4.64 mols) are passed through the catalyst at a constant rate over a period of about three hours while the temperature within the furnace is maintained at about 250° C. A yield of 575 parts by weight is secured being composed of 375 parts by weight difluorodichloromethane (3.09 mols), 90 parts by weight of fluorotrichloromethane (.65 mol), and 110 parts by weight of carbon tetrachloride (.71 mol). The gases formed contain 80.7 percent dichlorodifluoromethane and 19.3 percent fluorotrichloromethane. The reaction efficiency is calculated as 97.5 percent in relation to hydrofluoric acid and 95.2 percent based upon the amount of carbon tetrachloride.

Example 2

A gaseous mixture of 61.6 parts by weight of hydrofluoric acid per 240 parts by weight of chloroform per hour is passed through a catalyst prepared in accordance with Example 1 at a temperature of 350° C. The effluent product which was washed with caustic soda solution and dried on activated alumina contained trifluoromethane and chlorodifluoromethane in the molar ratio of 3.36 moles trifluoromethane to 1.16 mols of chlorodifluoromethane. The conversion of chloroform to the fluorinated derivatives took place quantitatively in relation to chloroform and with an efficiency of 87 percent in relation to the hydrofluoric acid.

Example 3

1000 parts by weight of activated alumina in the form of balls of 3-5 mm. and having a specific surface of 280 m.$^2$/gram and a microporous volume of 35 cm.$^3$/100 grams is impregnated with 75.5 parts by weight of gallium chloride dissolved in 300 parts by weight of carbon tetrachloride. The alumina, having a dry appearance, is introduced into a vertical tubular furnace of Monel metal which is air-jacketed for cooling and provided with electrical heating elements. Into the bottom of the furnace heated to 100° C. is introduced a current of anhydrous hydrofluoric acid diluted with nitrogen. Introduction is made at a flow rate so controlled that the temperature will not exceed 150° C. until 1000 parts by weight of HF has been introduced. Fluorination is completed upon the passage of 400 additional parts by weight of HF at a temperature of 800° C. after which the catalyst is sieved and charged into the reaction furnace.

A mixture of 81.6 parts by weight of hydrofluoric acid, 243 parts by weight of perchlorethylene and chlorine in the molar ratio of .95 chlorine to 1 perchlorethylene is passed over the catalyst at a temperature of 400° C. A reaction product of trifluorotrichloroethane, tetrafluorodichloroethane and a mixture of recoverable hexachloroethane and perchlorethylene is obtained with the fluorination reaction proceeding at an efficiency of 73.5 on HF and quantitatively on perchlorethylene.

Example 4

In a vertical tubular furnace of Monel metal, a mixture of 100 mols of chloroform per 105 mols of hydrofluoric acid is introduced onto a catalyst prepared in accordance with Example 3 at a reaction temperature controlled at about 175° C. The product collected at the outlet was analyzed to have the following composition given in percent by weight:

|  | Percent |
|---|---|
| $CHF_3$ | 3.74 |
| $CCl_2F_2$ | 0.02 |
| $CHClF_2$ | 48.90 |
| $CCl_3F$ | 1.29 |
| $CHCl_2F$ | 27.70 |
| $CHCl_3$ | 18.35 |

The reaction efficiency based upon hydrofluoric acid reached 90 percent.

Example 5

A mixture of 100 mols of chloroform per 150 mols of hydrofluoric acid is reacted under similar conditions as set forth in Example 4 except that the reaction temperature is raised to about 275° C. A mixture having the following composition is obtained as a product at an efficiency based upon hydrofluoric acid of up to 98.7 percent:

|  | Percent |
|---|---|
| $CHF_3$ | 34.20 |
| $CCl_2F_2$ | 0.67 |
| $CHClF_2$ | 29.80 |
| $CCl_3F$ | 0.11 |
| $CHCl_2F$ | 10.55 |
| $CHCl_3$ | 24.61 |

It will be apparent from the foregoing that I have provided a new and improved fluorination catalyst and process wherein an efficient and high rate of fluorination is achieved at relatively low temperature.

It will be understood that the described fluorination reactions can be carried out on other halogenated or unhalogenated aliphatic hydrocarbons and it will be understood further that while it is preferred to carry out the fluorination reaction at atmospheric pressure, reaction may also be carried out under positive pressures if desired.

I claim:

1. The process of fluorination of a halogenated aliphatic hydrocarbon to replace halogen other than fluorine with fluorine comprising contacting the halogenated aliphatic hydrocarbon with hydrofluoric acid in the presence of a gallium fluoride as a catalyst and at a temperature within the range of 150–450° C.

2. The process of fluorination of a halogenated aliphatic hydrocarbon to replace halogen other than fluorine with fluorine comprising contacting the halogenated aliphatic hydrocarbon with hydrofluoric acid in the presence of gallium fluoride as a catalyst and at a temperature within the range of 175–450° C.

3. The process of fluorination to substitute fluorine for chlorine present in an aliphatic hydrocarbon selected from the group consisting of methane, ethane, ethylene, propane and propylene, comprising contacting the chlorinated aliphatic hydrocarbon with hydrofluoric acid in the presence of gallium fluoride as a catalyst and at a temperature of 175–450° C.

4. The process of fluorination of a halogenated aliphatic hydrocarbon to replace halogen other than fluorine with fluorine comprising contacting the halogenated aliphatic hydrocarbon with hydrofluoric acid at a temperature of 175–450° C. and in the presence of a gallium fluorine as the catalyst present on a carrier selected from the group consisting of activated charcoal and aluminum oxide.

5. In the method of preparing a catalyst for the fluorination of a halogenated aliphatic hydrocarbon to replace halogen other than fluorine with fluorine comprising impregnating a carrier selected from the group consisting of activated charcoal and aluminum oxide with a gallium compound, passing hydrofluoric acid into contact with the impregnated carrier at a temperature between 150–250° C. to convert the gallium compound to a gallium fluoride and then using the gallium fluoride on the carrier as a catalyst in the fluorination reaction to substitute fluorine for the halogen on the halogenated aliphatic hydrocarbon in the presence of hydrofluoric acid and at a temperature within the range of 175–450° C.

6. The method as claimed in claim 5 in which the gallium compound comprises a gallium salt.

7. In the method of preparing a catalyst for fluorination of a halogenated aliphatic hydrocarbon to replace halogen other than fluorine with fluorine comprising contacting activated charcoal with hydrofluoric acid to remove silica, impregnating the activated charcoal with a gallium halide, contacting the impregnated activated charcoal with hydrofluoric acid to substitute fluorine for the halide for conversion of the gallium halide to gallium fluoride.

8. In the method of preparing a catalyst for the fluorination of a halogenated aliphatic hydrocarbon to replace halogen other than fluorine with fluorine comprising impregnating an adsorbent carrier with a solution of gallium chloride, passing hydrofluoric acid into contact with the impregnated carrier to convert the gallium chloride to gallium fluoride.

9. The process of fluorination of chloroform to substitute fluorine for chlorine comprising passing chloroform and hydrofluoric acid into contact with gallium fluoride as a catalyst at a temperature of 175–450° C. to produce trifluoromethane and difluorochloromethane as reaction products.

10. The process of fluorination of carbon tetrachloride to substitute fluorine for chlorine comprising passing carbon tetrachloride and hydrofluoric acid into contact with gallium fluoride as a catalyst and at a temperature of 175–450° C. to produce difluorodichloromethane, trifluorochloromethane and trichlorofluoromethane as reaction products.

11. The process of fluorination of perchloroethylene to substitute fluorine for chlorine comprising passing perchloroethylene and hydrofluoric acid into contact with gallium fluoride as a catalyst at a temperature of 175–450° C. to produce trifluorotrichloroethane and tetrafluorodichloroethane as reaction products.

References Cited in the file of this patent

UNITED STATES PATENTS

| | | |
|---|---|---|
| 2,406,869 | Upham | Sept. 3, 1946 |
| 2,522,687 | Padgitt et al. | Sept. 19, 1950 |
| 2,946,828 | Scherer et al. | July 26, 1960 |
| 3,004,930 | Engelbrecht et al. | Oct. 17, 1961 |